No. 717,062. Patented Dec. 30, 1902.
A. A. ADAMS.
RANGE FINDER.
(Application filed Mar. 4, 1902.)
(No Model.)
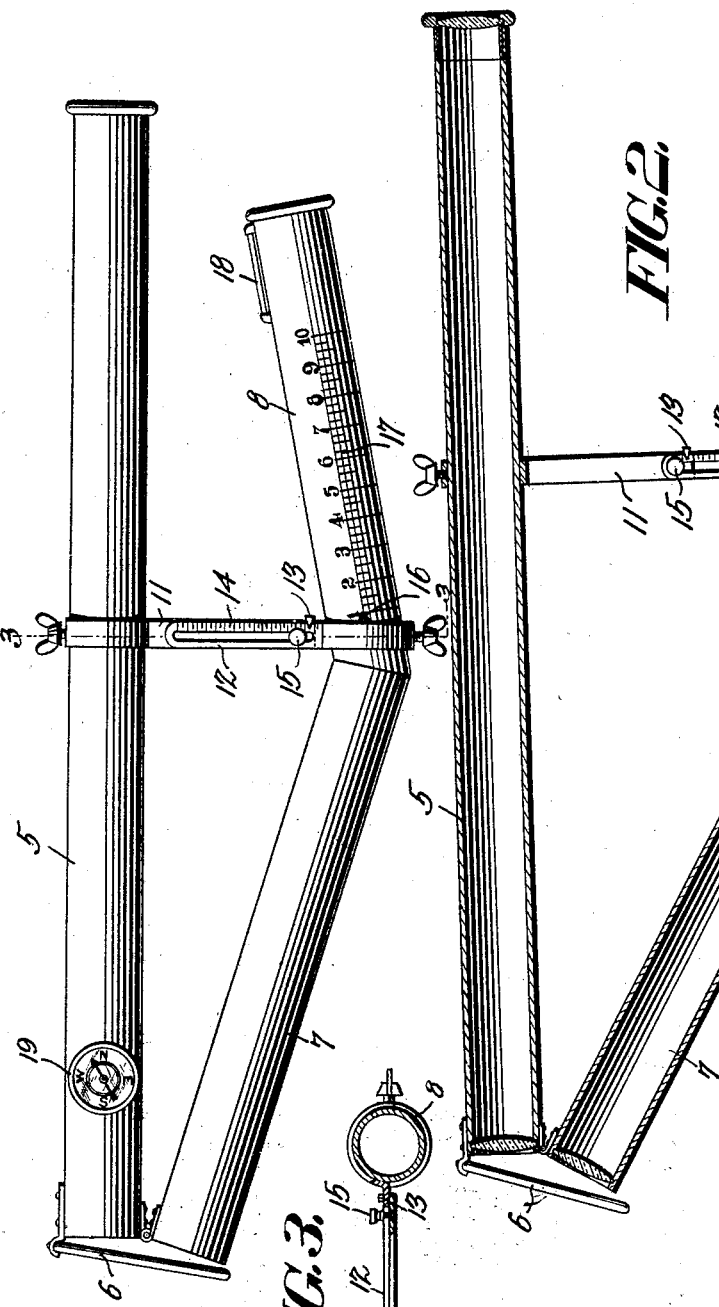
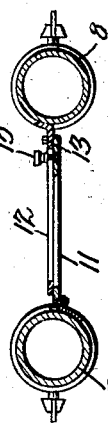
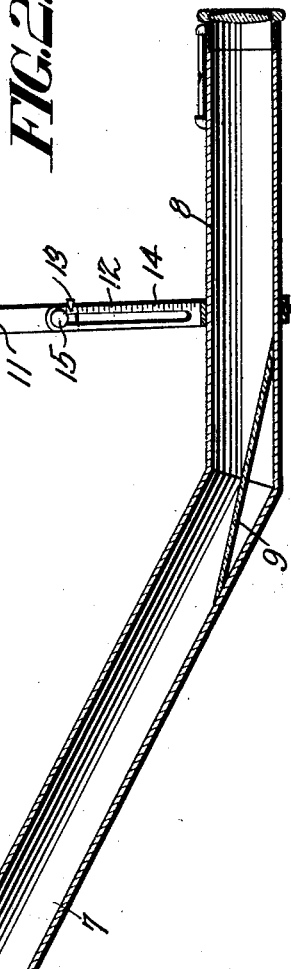
Witnesses
F. E. Alden.
Harry Ellis Chandler
A. A. Adams, Inventor.
by Chandler & Chandler
Attorney
THE NORRIS PETERS CO., PHOTO-LITHO., WASHINGTON, D. C.

UNITED STATES PATENT OFFICE.

AMOS ANDY ADAMS, OF EHRENBURG, ARIZONA TERRITORY.

RANGE-FINDER.

SPECIFICATION forming part of Letters Patent No. 717,062, dated December 30, 1902.

Application filed March 4, 1902. Serial No. 96,690. (No model.)

*To all whom it may concern:*

Be it known that I, AMOS ANDY ADAMS, a citizen of the United States, residing at Ehrenburg, in the county of Yuma, Arizona Territory, have invented certain new and useful Improvements in Range-Finders; and I do hereby declare the following to be a full, clear, and exact description of the invention, such as will enable others skilled in the art to which it appertains to make and use the same.

This invention relates to range-finders; and it has for its object to provide an instrument of this nature which may be operated to automatically indicate the distance of an object, a further object of the invention being to provide an instrument which after having been operated to indicate the distance of an object may be operated to automatically indicate the height of the object.

Other objects and advantages of the invention will be understood from the following specification.

In the drawings forming a portion of the specification, and in which like numerals of reference indicate similar parts in the several views, Figure 1 is a plan view showing the instrument in position to measure the distance of an object. Fig. 2 is a sectional view showing the instrument adjusted to indicate the height of an object. Fig. 3 is a section on line 3 3 of Fig. 1.

Referring now to the drawings, the range-finder consists of a straight tube 5, having lenses therein in the manner of a telescope and pivoted to one end of which is the eyepiece 6, comprising a metal plate having a perforation therein in order to prevent the user of the device from placing his eye too near the lenses of the tubes. Hinged to the end of the tube 5, which bears the eyepiece, is the member 7 of an angular tube, comprising also a member 8. The member 7, adjacent to the eyepiece, has a lens, and at the outer end of the member 8 is also a lens, while at the angle of the members 7 and 8 is a fixed mirror 9, so disposed that a ray of light passing through one lens will be reflected through the other lens. Thus if a person looks through the eyepiece his vision will traverse both tubes and will pass from the outer ends of the tube along converging lines. Attached to the two tubes are metal plates 11 and 12, which are slidably engaged, the plate 11 having an index 13, which is adapted to traverse a scale 14 on the plate 12 as the two tubes are moved on their pivotal connection.

In determining the distance of an object from the operator of the device the tubes are manipulated until it is possible to see the same object through both tubes. It will thus be seen that the point occupied by the object will form the apex of a right-angle triangle the base of which is formed by the plates 11 and 12, the altitude being formed by the sight-line down the tube 5 from the point at which it passes the plate 11, continued to the point occupied by the object, and the hypotenuse by the sight-line passing through the angular member 8 from the point at which it strikes the mirror to the point occupied by the object. Thus a right-angle triangle is obtained in which the base and the angle of the hypotenuse are known. It is but a simple proposition in geometry to determine the altitude of such a triangle. This may easily be done by mathematics at each operation of the device, or the relative angle and length of the plates 11 and 12 may be determined for all distances and the result marked upon the plate 12, so that it will be but necessary to note the scale. The plates 11 and 12 are slidably connected to the tube 5 and member 8, respectively, and when the distance is determined the plates are at the angle of the members 7 and 8. The plate 12 has an index 16, which traverses a scale 17 on the member 8, while on the upper face of the member 8 is a spirit-level 18.

To determine the height of an object, the distance of the object is first determined in the manner above described, after which the instrument is held with both tubes in a vertical plane and the plates 11 and 12, which have been secured rigidly together, as above mentioned, are slid in the direction of the outer end of the member 8. At the same time the member 8 is held horizontal, and as the plates 11 and 12 are slid as mentioned the tube 5 is raised until the topmost point of the object is seen through the tube. The sight-lines of both tubes and the plates 11 and 12 now form a truncated right-angle triangle of which the base is the height of the object and the altitude the predetermined distance of the object. The angle between the plate 12 and the hypotenuse is of course known and there is required but a second simple operation to determine the length of the base. The index 16 then shows on the scale 17 the height of the object. It is of course understood that this scale is marked in the same manner as that upon the plate 12, and it should be understood that should it be so desired these scales may be marked by setting the instrument on known distances instead of in the mathematical manner above described. To facilitate accuracy of the instrument, the lenses at the outer ends of the tubes have diametrical lines 18 marked thereon and the point of intersection of the lines is the sighting-point on each lens.

It will thus be seen that the present instrument has a twofold use, and it will be understood that in practice modifications may be made and any suitable materials and proportions may be used for the parts without departing from the spirit of the invention.

As shown in the drawings, the tube 5 is provided with a compass 19.

What is claimed is—

1. An instrument of the class described comprising tubes having a hinge connection, one of said tubes being angular to converge one portion thereof toward the other tube at its end opposite to the hinge connection, a mirror within the angular tube disposed to reflect from one portion of the tube through the other portion, a scale connected to and movable with one tube, a dial connected to and movable with the other tube in operative relation to the scale to indicate the angle of the tubes, means for holding the scale and dial in fixed relation, said dial and scale being slidable longitudinally of the said convergent portions of the tube, a scale upon one of the tubes and a second dial movable with the first dial and the scale, over the second scale.

2. An instrument of the class described comprising sighting-tubes having a hinge connection at one end, one of said tubes being angular and having its free end portion converged in the direction of the other tube whereby both tubes may be concentrated upon a single point, means for indicating the distance of the point on which the tubes are concentrated, plates slidably engaged with said convergent portions of the tubes, said plates being themselves slidably connected to permit variations of the angle of the tubes, means for holding said plates in fixed mutual relation, a scale upon one of the tubes, an index carried upon one of the plates and disposed to traverse the scale, and a leveling device carried by one of the tubes.

In testimony whereof I affix my signature in presence of two witnesses.

AMOS ANDY ADAMS.

Witnesses:
GUS LIVINGSTON,
A. P. BEHAN.